United States Patent
Kobayashi et al.

(10) Patent No.: US 8,833,503 B2
(45) Date of Patent: Sep. 16, 2014

(54) WORK VEHICLE

(75) Inventors: Daisuke Kobayashi, Sakai (JP);
Tatsuyuki Kashimoto, Sakai (JP);
Makoto Saegusa, Osakasayama (JP);
Mikio Ishida, Osaka (JP); Atsushi Yamaguchi, Sakai (JP)

(73) Assignee: Kubota Corporation, Osaka (JP)

( * ) Notice: Subject to any disclaimer, the term of this patent is extended or adjusted under 35 U.S.C. 154(b) by 107 days.

(21) Appl. No.: 13/061,867

(22) PCT Filed: Mar. 3, 2010

(86) PCT No.: PCT/JP2010/053456
§ 371 (c)(1),
(2), (4) Date: Jun. 14, 2011

(87) PCT Pub. No.: WO2011/077758
PCT Pub. Date: Jun. 30, 2011

(65) Prior Publication Data
US 2011/0252911 A1    Oct. 20, 2011

(30) Foreign Application Priority Data

Dec. 22, 2009 (JP) .................. 2009-291222
Dec. 22, 2009 (JP) .................. 2009-291223

(51) Int. Cl.
*B60K 20/06* (2006.01)
*E02F 9/20* (2006.01)
*F16H 59/02* (2006.01)

(52) U.S. Cl.
CPC ............ *B60K 20/06* (2013.01); *E02F 9/2004* (2013.01); *F16H 59/0278* (2013.01); *B60Y 2200/221* (2013.01)
USPC ................... 180/334; 74/473.31; 180/336

(58) Field of Classification Search
CPC .... E02F 9/2004; F16H 59/02; F16H 59/0278; B60Y 2200/221; G05G 13/00; B60K 20/06
USPC .................. 180/334, 336; 74/473.31, 523
See application file for complete search history.

(56) References Cited

U.S. PATENT DOCUMENTS

| | | | | |
|---|---|---|---|---|
| 2,195,269 | A * | 3/1940 | Coughtry .................. | 74/473.24 |
| 2,531,582 | A * | 11/1950 | Myers ..................... | 192/3.62 |
| 6,499,550 | B2 * | 12/2002 | Matsuda et al. ........... | 180/90 |
| 7,444,897 | B2 * | 11/2008 | Komine et al. ........... | 74/473.1 |
| 7,648,001 | B2 * | 1/2010 | Yanagihara et al. ........ | 180/336 |
| 7,828,107 | B2 * | 11/2010 | Yoshikawa et al. ......... | 180/323 |
| 8,172,714 | B2 * | 5/2012 | Ishimori et al. .......... | 475/275 |
| 2007/0056793 | A1 | 3/2007 | Yanagihara et al. | |

FOREIGN PATENT DOCUMENTS

| JP | 05010442 | 1/1993 |
|---|---|---|
| JP | 6-35022 U | 5/1994 |
| JP | 08-028670 A | 2/1996 |
| JP | 08-332869 A | 12/1996 |

(Continued)

*Primary Examiner* — Paul N Dickson
*Assistant Examiner* — Timothy Wilhelm
(74) *Attorney, Agent, or Firm* — The Webb Law Firm

(57) ABSTRACT

There are provided a forward/reverse switchover lever pivotally operably about, as a pivotal center, a position which is inwardly of an outer periphery of a steering wheel and laterally outer side of vehicle body of a rotational axis of the steering wheel as seen in a direction along the rotational axis and a pivotal support shaft pivotally supporting the forward/reverse switchover lever at a position lower than the steering wheel such that a pivotal end of the forward/reverse switchover lever projects to the laterally outer side beyond the outer periphery of the steering wheel.

8 Claims, 5 Drawing Sheets

(56) References Cited

FOREIGN PATENT DOCUMENTS

| | | | |
|---|---|---|---|
| JP | 9-301005 A | 11/1997 |
| JP | 2000-225867 A | 8/2000 |
| JP | 2007-76458 A | 3/2007 |
| JP | 2007-263259 A | 10/2007 |
| JP | 2008-006902 A | 1/2008 |

* cited by examiner

WORK VEHICLE

TECHNICAL FIELD

The present invention relates to work vehicle including a rotatably operable steering wheel and a forward/reverse switchover lever pivotably operable between a forward traveling position capable of switching a traveling direction to the forward direction and a reverse traveling position capable of switching the traveling direction to the reverse direction, across a neutral position therebetween, the steering wheel and the forward/reverse switchover lever being provided forwardly of a driver's seat.

BACKGROUND ART

Conventionally, for instance, in a work vehicle disclosed in Patent Document 1, a rotatably operable steering wheel and a forward/reverse switchover lever pivotably operable between a forward traveling position capable of switching a traveling direction to the forward direction and a reverse traveling position capable of switching the traveling direction to the reverse direction across a neutral position therebetween are provided forwardly of a driver's seat. So, a driver can easily operate the forward/reverse switchover lever without having to change his/her posture for operating the steering wheel.

The forward/reverse switchover lever is supported to be pivotable at a position lower than the steering wheel. Further, the forward/reverse switchover lever is pivotally operable about a pivotal axis which is located inwardly of the outer periphery of the steering wheel and on the vehicle body lateral outer side of the steering wheel as seen in the direction along the rotational axis of the steering wheel, so that the forward/reverse switchover lever is disposed in a compact manner under the steering wheel.

Further, since the forward/reverse switchover lever is supported such that the pivotal end thereof protrudes to the lateral outer side beyond the outer periphery of the steering wheel as seen along the direction of rotational axis of the steering wheel, this forward/reverse switchover lever can be gripped easily. Further, as the forward traveling position is set more forwardly of the vehicle body than the reverse traveling position, the operational feel of the forward/reverse switchover lever can be assimilated with the actual traveling feel, so that erroneous operations of the forward/reverse switchover lever can be readily avoided.

Prior-Art Document

Patent Document

Patent Document 1: Japanese Patent Application "Kokai" No. 2008-6902 (FIG. 16 (front view), FIG. 17, FIG. 19 (side views)).

SUMMARY OF THE INVENTION

Object to be Achieved by Invention

With the work vehicle disclosed in Patent Document 1, the pivotal axis of the forward/reverse switchover lever and the rotational axis of the steering wheel are disposed parallel with each other and parallel also with the vehicle body width direction, such that the pivotal center of the forward/reverse switchover lever is disposed immediately laterally of the pivotal axis of the steering wheel in the vehicle body width direction, as seen in the direction along the rotational axis of the steering wheel.

Because of the above arrangement, if the pivotal center of the forward/reverse switchover lever, together with the rotational axis of the steering wheel, is disposed sufficiently forwardly away from the driver's seat in order to reduce the risk of the driver's body accidentally coming into contact with the forward/reverse switchover lever, this can impair the operational readiness of the steering wheel disadvantageously.

Further, in the case of the work vehicle disclosed in Patent Document 1, arrangement is provided such that the amount of projection of the forward/reverse switchover lever from the outer periphery of the steering wheel as seen long the direction of the rotational axis of the steering wheel may remain the same whether the forward/reverse switchover lever is pivotally operated to the forward traveling position or pivotally operated to the reverse traveling position.

Because of the above arrangement, if the above-described projection amount is set to be greater when the forward/reverse switchover lever is pivotally operated to the forward traveling position in order to facilitate the driver's gripping of the forward/reverse switchover lever when pivotally operated to the forward traveling position rather distant from the driver's seat, this will result in increase also in the projection amount when the forward/reverse switchover lever is pivotally operated to the reverse traveling position which is near the driver's seat. As a result, the risk of the driver's body accidentally coming into contact with the forward/reverse switchover lever increases.

The present invention has been made in view of the above-described state of the art. The object of the invention is to provide a work vehicle that lowers the risk of the driver's body accidentally coming into contact with the forward/reverse switchover lever and facilitates the driver's gripping of the forward/reverse switchover lever when the lever is pivotally operated to the forward traveling position, without impairing the operational readiness of the steering wheel.

Means for Resolving the Problem

According to the first characterizing feature of the work vehicle relating to the present invention, the work vehicle comprises:

a steering wheel disposed forwardly of a driver's seat and rotatably operable;

a forward/reverse switchover lever disposed forwardly of the driver's seat and pivotably operable between a forward traveling position capable of switching a traveling direction to the forward direction and a reverse traveling position on more rear side of the vehicle body than said forward traveling position and capable of switching the traveling direction to the reverse direction, across a neutral position therebetween, the forward/reverse switchover lever being pivotally operable about, as a pivotal center thereof, a position that is inwardly of an outer periphery of said steering wheel and that is laterally outer side of the vehicle body of a rotational axis of said steering wheel as seen along the direction of this rotational axis; and a pivotal support shaft pivotally supporting said forward/reverse switchover lever at a position lower than said steering wheel such that a pivotal end of said forward/reverse switchover lever projects laterally outward beyond the outer periphery of said steering wheel as seen along the direction of said rotational axis;

wherein said pivotal center is set more laterally outer side of vehicle body than said rotational axis and more forwardly of the vehicle body than said rotational axis as seen along the direction of the rotational axis such that, as seen along the direction of the rotational axis, the projection amount of the pivotal end from the outer periphery of the steering wheel when the forward/reverse switchover lever is pivotally operated to the reverse traveling position is smaller than the projection amount thereof when the forward/reverse switchover lever is pivotally operated to the forward traveling position.

With this construction, the pivotal center of the steering wheel is set more forwardly of the vehicle body than the rotational axis of the steering wheel as seen along the direction of the rotational axis such that the projection amount of the pivotal end from the outer periphery of the steering wheel when the forward/reverse switchover lever is pivotally operated to the reverse traveling position is smaller as seen along the direction of the rotational axis than the projection amount thereof when the forward/reverse switchover lever is pivotally operated to the forward traveling position. Therefore, even when the forward/reverse switchover lever is pivotally operated to the reverse traveling position near the driver's seat, the risk of the driver's body accidentally coming into contact with the forward/reverse switchover lever is low. Also, when the forward/reverse switchover lever is pivotally operated to the forward traveling position, the projection amount of the pivotal end is increased, so that the forward/reverse switchover lever located at the forward traveling position distant from the driver's set can be easily gripped, without being obstructed by the steering wheel.

With this construction, the risk of impairing the operational readiness of the steering wheel and the risk of the driver's body accidentally coming into contact with the forward/reverse switchover lever located at the reverse traveling position are low. And, the forward/reverse switchover lever located at the forward traveling position can be gripped easily. In particular, when the driver gets on/off the vehicle, thanks to the reduced risk of the driver's body accidentally coming into contact with the forward/reverse switchover lever located at the reverse traveling position, the driver can get on/off the vehicle smoothly and easily.

In the above-described construction, preferably, said pivotal support shaft is disposed such that the pivotal axis of this pivotal support shaft is inclined toward the forward side of the vehicle body relative to said rotational axis as seen laterally.

With this construction, the pivotal axis of the pivotal support shaft is inclined such that its upper side progressively approaches the forward side of the vehicle body and away from the rotational axis of the steering wheel. Therefore, the distance between the forward/reverse switchover lever and the steering wheel in the direction along the rotational axis of the steering wheel becomes smaller when the forward/reverse switchover lever is pivotally operated to the reverse traveling position than when this lever is pivotally operated to the forward traveling position. That is, in comparison with the case where the pivotal axis of the pivotal support shaft is disposed parallel with the rotational axis of the steering wheel, the height position of the forward/reverse switchover lever when pivotally operated to the reverse traveling position may be higher. Therefore, the risk of the driver's body such as his/her leg accidentally coming into contact with the forward/reverse switchover lever can be further reduced, while maintaining the readiness of the driver's gripping of the forward/reverse switchover lever when this lever is pivotally operated to the forward traveling position.

In the above-described construction, preferably, a longitudinal intermediate portion of the forward/reverse switchover lever is flexed in the direction along the pivotal direction as seen in the direction along the rotational axis.

According to the above-described construction, with appropriate selection of the shape of flexion of the forward/reverse switchover lever at its longitudinal intermediate portion, the pivotal range of the pivotal end of the forward/reverse switchover lever, that is, the pivotal range of the portion thereof projecting laterally outward beyond the outer periphery of the steering wheel, can be easily set to a desired range, without need to change the operable coupling arrangement relative to the switching portion switched over by the forward/reverse switchover lever.

In the above-described construction, preferably, the forward/reverse switchover lever is flexed from the side of the reverse traveling position toward the side of the forward traveling position.

With this construction, the forward/reverse switchover lever is flexed in the direction from the reverse traveling position side to the forward traveling position side, that is, toward the direction away from the driver's body. Therefore, the driver can easily operate the forward/reverse switchover lever.

In the above construction, preferably, the work vehicle further comprises:

a guide plate including a fixing portion to be fixed to a support member supporting said pivotal support shaft, a support shaft inserting hole engageable with said pivotal support shaft inserted therein, a plate face extending normal to said pivotal support shaft, and a guiding portion formed in said plate face for selectively guiding said forward/reverse switchover lever to the forward traveling position or the reverse traveling position or to said neutral position, said guiding portion being engageable with said forward/reverse switchover lever at positions corresponding to said forward traveling position, said reverse traveling position and said neutral position; and wherein said forward/reverse switchover lever includes an engaging shaft portion provided substantially parallel with said pivotal support shaft and engageable with said guiding portion.

With this construction, the fixing portion of the guide plate can be assembled to the forward/reverse switchover lever by fixing the fixing portion to the support member of the pivotal support shaft, rather than via a separate member conventionally provided. Therefore, the assembling precision of the guide plate to the forward/reverse switchover lever depends on the assembling precision of the guide plate to the support member, not on assembling precision of the guide plate to a separate member or assembling precision of the separate member to the support member.

Further, as the guide plates includes a support shaft inserting hole allowing insertion of the pivotal support shaft therein for establishing engagement between this pivotal support shaft and the guide plate, the pivotal support shaft and the guide plate can be fixed in position relative to each other by inserting the pivotal support shaft into the support shaft inserting hole to be engaged therewith. Hence, it is easy to enhance the assembly precision of the guide plate relative to the forward/reverse switchover lever supported to the pivotal support shaft.

Moreover, as the forward/reverse switchover lever includes an engaging shaft portion engageable with the guiding portion and this engaging shaft portion is provided substantially parallel with the pivotal support shaft, the guide plate can be disposed in a compact manner in close vicinity of the pivotal support shaft, in comparison with a case wherein such engaging shaft portion is provided in the direction normal to the pivotal support shaft to be engaged with the guiding portion.

In addition, since the guiding portion is formed in a plate face extending normal to the pivotal support shaft, when the forward/reverse switchover lever is to be assembled with the pivotal support shaft, with a series of operations for assembling the forward/reverse switchover lever to this pivotal support shaft along the direction parallel with this pivotal support shaft, the engaging shaft portion too can be brought into engagement with the guiding portion. Therefore, the guide plate can be assembled to the forward/reverse switchover lever easily and with high precision, without complicating this assembly operation.

In the above-described construction, preferably, said guiding portion and said engaging shaft portion are disposed closer to a rotational support shaft rotatably supporting the steering wheel than the pivotal support shaft.

With the above-described construction, the engaging shaft portion and the guide plate forming the guiding portion engageable with this engaging shaft portion can be disposed neatly and compactly under the steering wheel, closer to the rotational support shaft than the pivotal support shaft.

In the above-described construction, preferably, said guide plate integrally forms a bearing plate portion which includes a bearing for rotatably supporting said pivotal support shaft in cooperation with said support shaft inserting hole.

With the above-described construction, in addition to the insertion of the pivotal support shaft into the support shaft inserting hole, the pivotal support shaft is rotatably supported to the bearing fixed to the bearing plate portion. Therefore, the relative position between the guide plate and the pivotal support shaft can be fixedly set as the relative position between the guide plate and the bearing. Hence, it becomes even easier to enhance the precision of assembling of the guide plate to the forward/reverse switchover lever supported to the pivotal support shaft.

MODE OF EMBODYING THE INVENTION

Figure 1:
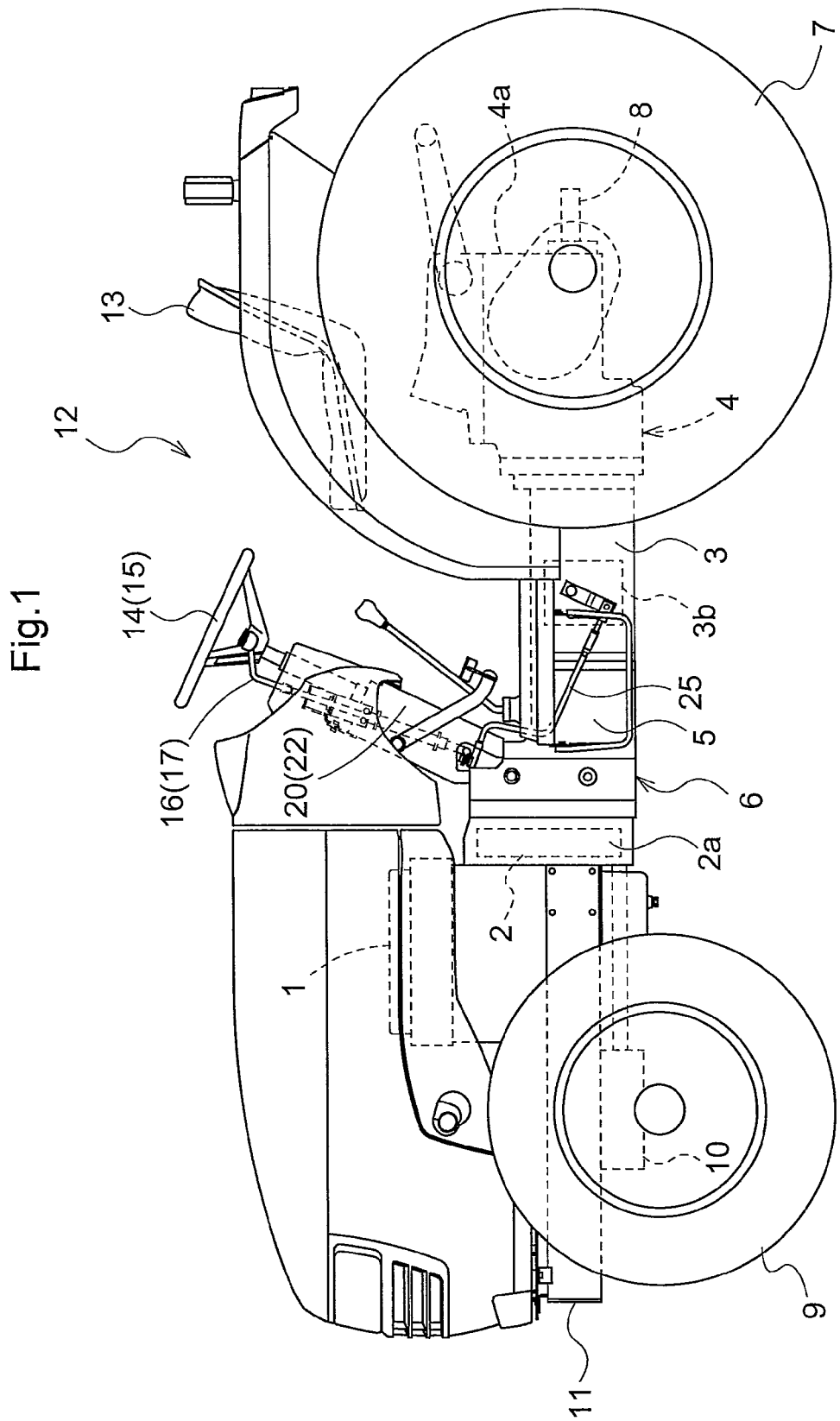
[FIG. 1] is a general side view of a work vehicle (a tractor),
[FIG. 2] is a block diagram showing a transmission structure,
[FIG. 3] is a side view showing a steering operation section and a forward/reverse switchover operation section,
[FIG.] 4 is a plane view showing a steering wheel and a forward/reverse switchover lever, as seen in the direction along a rotational axis of the steering wheel,
[FIG. 5] is a plane view of principal portions showing relations among a pivotal support shaft and an engaging shaft portion of the forward/reverse switchover lever and a guiding portion of a guide plate,
[FIG. 6] is a side view showing the steering operation section and the forward/reverse switchover operation section, as seen along the direction of forward side of a vehicle body, and
[FIG. 7] is an exploded perspective view of principal portions showing the forward/reverse switchover operation section.
Figure 2:
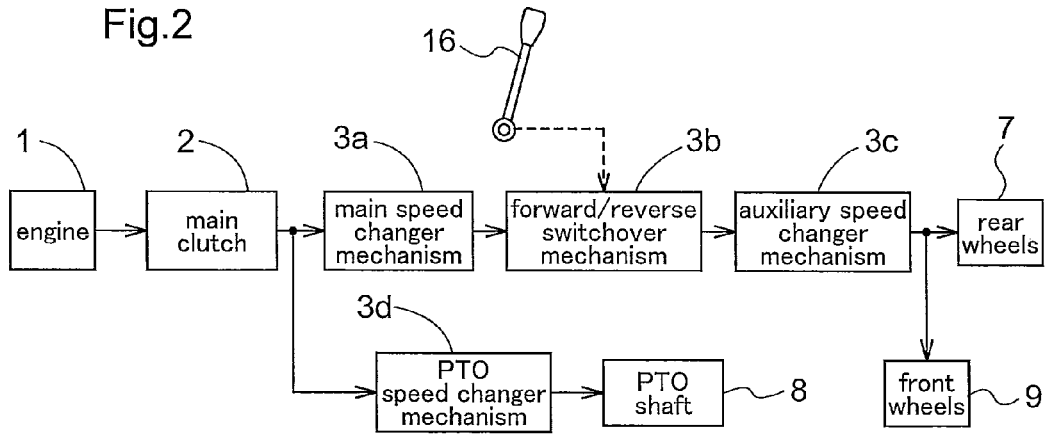

Next, embodiments of the present invention will be described with reference to the accompanying drawings. FIG. 1 is a general side view of a tractor as an example of a work vehicle according to the present invention. FIG. 2 is a block diagram showing a transmission structure of the tractor.

The tractor includes a vehicle body 6 provided rearwardly of an engine 1 and comprising a clutch housing 2a housing a main clutch 2, a transmission case 3 housing a main speed changer mechanism 3a, a forward/reverse switchover mechanism 3b, an auxiliary speed changer mechanism 3c and a PTO speed changer mechanism 3d, and a rear transmission case portion 4 including a differential case 4a, with the housing 2a, the case 3, and the case portion 4 connected to each other via a housing frame 5, thus constituting the vehicle body 6.

To the differential case 4a directly connected to the rear end of the transmission case 3, right and left rear wheels 7 are rotatably supported. A PTO shaft 8 projects rearward from the differential case 4a. A front axle case 10 mounts right and left front wheels 9 with allowing steering operations of these front wheels 9. This front axle case 10 is mounted to a front frame 11 connected to the engine 1, with the case 10 being capable of free rolling movements.

A driver's section 12 mounted on top of the vehicle body 6 includes a steering operation section 15 provided forwardly of a driver's seat 13 and including a rotatably operable steering wheel 14 operably coupled to the right and left front wheels 9 and a forward/reverse switchover operation section 17 having a forward/reverse switchover lever 16 capable of switching over the traveling direction between forward traveling and reverse traveling.

Figure 3:
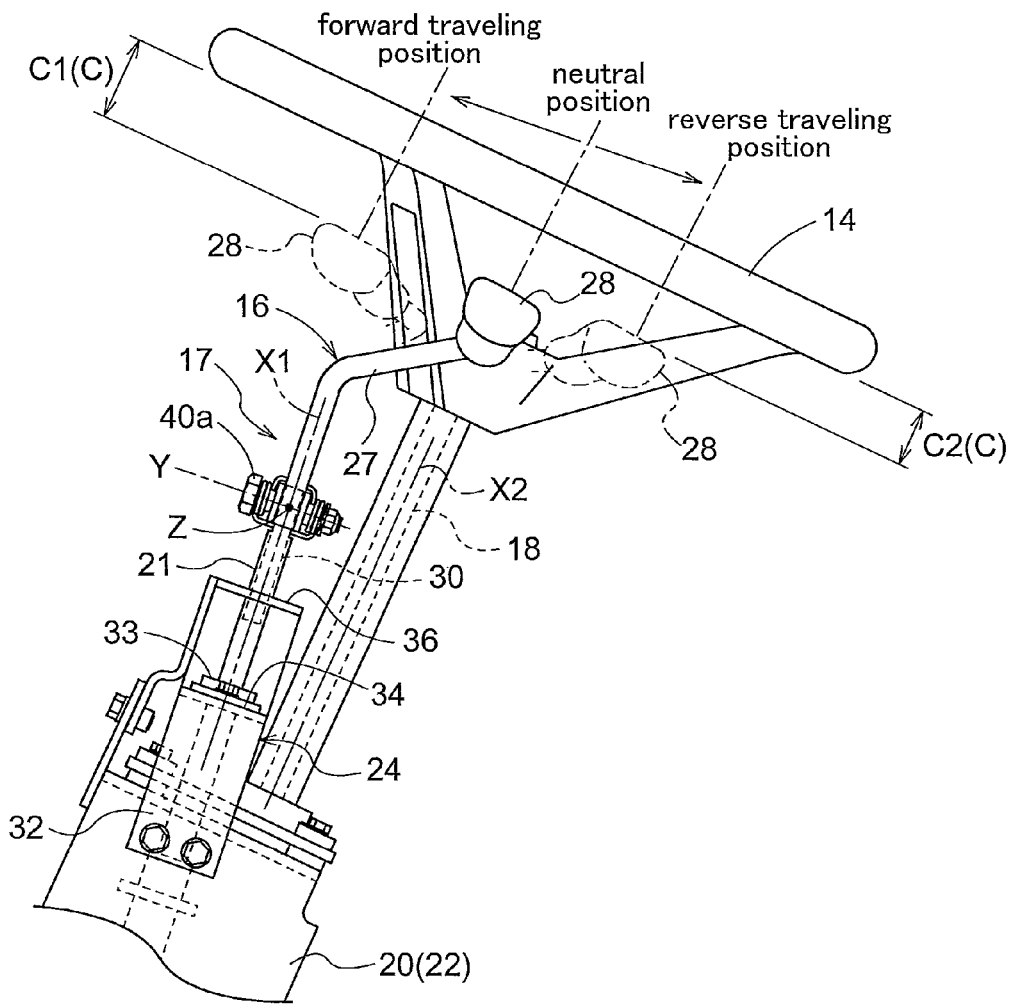
Figure 6:
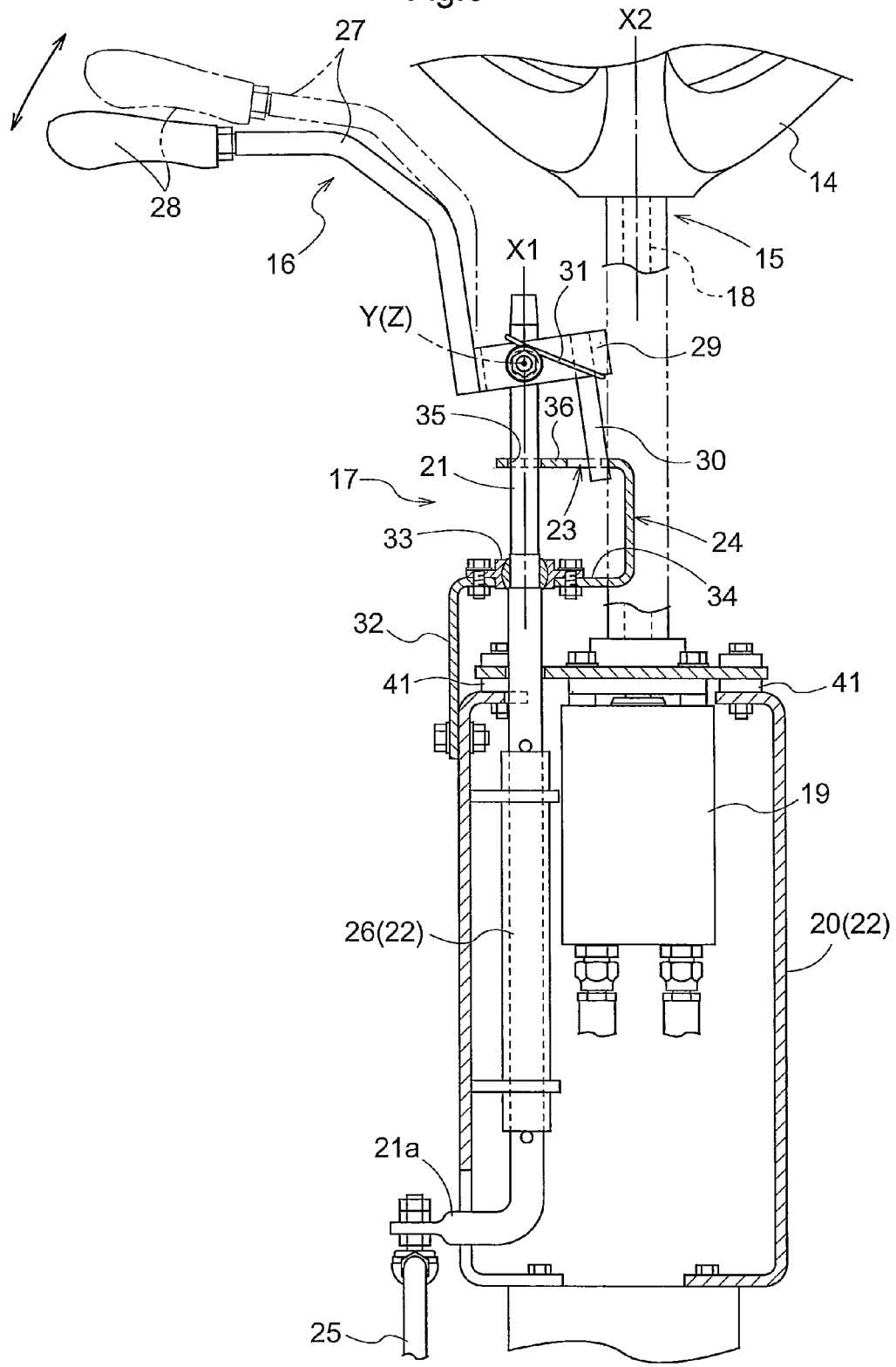

The steering operation section 15, as shown in FIG. 3 and FIG. 6, a rotational support shaft 18 rotatably supporting the steering wheel 14 and a power steering unit 19 directly coupled to the rotational support shaft 18. The rotational support shaft 18 and the power steering unit 19 are supported to a support box 20 fixed to the vehicle body 6 via anti-vibration rubbers 41 for preventing vibrations thereof.

The forward/reverse switchover operation section 17, as shown in FIG. 3, FIG. 4, FIG. 6, FIG. 7, includes a pivotal support shaft 21 for supporting the forward/reverse switchover lever 16 with allowing this lever 16 to be pivotable, across a neutral position, between a forward traveling position capable of switching the traveling direction to the forward direction and a reverse traveling position capable of switching the traveling direction to the reverse direction, a support member 22 (20, 26) rotatably supporting the pivotal support shaft 21 while preventing inadvertent withdrawal thereof, and a guide plate 24 forming a guiding portion 23 engageable with the forward/reverse switchover lever 16 for guiding its pivotal movements. The forward traveling position is set on more forward side of the vehicle body than the reverse traveling position. The guide plate 24 is disposed along the direction normal to the pivotal support shaft 21. Therefore, the guiding portion 23 is formed as a plate face extending normal to the pivotal support shaft 21.

In order to allow switching over the forward/reverse switchover mechanism 3b with rotation of this pivotal support shaft 21 in response to a pivotal operation of the forward/reverse switchover lever 16, without mediation of a universal joint therebetween, as shown in FIG. 6, a lower end portion 21a of this pivotal support shaft 21 is flexed in L-shape to be operably coupled to a switchover operating link member 25 of the forward/reverse switchover mechanism 3b. In this way, the operative coupling structure between the forward/reverse switchover lever 16 and the forward/reverse switchover mechanism 3b can be formed simple and also feeling of operating the forward/reverse switchover mechanism 3b can be readily and smoothly transmitted to the driver via the forward/reverse switchover lever 16.

The support member 22 of the pivotal support shaft 21, as shown in FIG. 6, consists essentially of a support cylinder 26 in which the pivotal support shaft 21 is inserted with inadvertent withdrawal thereof being prevented and a support box 20 to whose inside this support cylinder 26 is fixed integrally by means of welding or the like. The pivotal support shaft 21 is supported not to the rotational support shaft 18 of the steering wheel 14 which shaft has the anti-vibration feature, but to the support member 22 (20, 26) having no such anti-vibration feature, so there occurs no impairment in the operating feel of the forward/reverse switchover lever 16. Therefore, vibrations from the rotational support shaft 18 and/or the power steering unit 19 are hardly transmitted to the forward/reverse switchover lever 16.

The forward/reverse switchover lever 16, as shown in FIG. 3, FIG. 4, FIG. 6, FIG. 7, includes a lever body 27, a gripping portion 28 ("a pivotal end" defined in the present invention) fixed to the pivotal end of the lever body 27 to be gripped by the driver, a pivotal supporting portion 29 having U-shape in its plane view and bolt-fixed to the pivotal support shaft 21 to be immovable relative thereto and vertically pivotable about a horizontal axis Y normal to a pivotal axis X1 (the axis of the pivotal support shaft 21), and an engaging shaft portion 30 engageable with the guiding portion 23 of the guide plate 24.

More particularly, the pivotal support portion 29, together with the forward/reverse switchover lever 16, is assembled to the pivotal support shaft 21, along the direction parallel with the pivotal support shaft 21 and is bolt-fixed to be vertically pivotable about the axis Y of a bolt 40a with a nut 40b, with the bolt 40a being inserted through a through hole 29a defined in the pivotal support portion 29a and through a through hole 21a defined at the leading end of the pivotal support shaft 21.

The forward/reverse switchover lever 16 is flexed in a angular hook shape as shown in the side view of FIG. 3. And, in the plane view shown in FIG. 4 (as seen along the direction of the rotational axis X2 of the steering wheel 14), a flexed portion 27a of the lever body 27 is located on the vehicle body rear side relative to a line segment interconnecting the gripping portion 28 and the pivotal axis X1 such that the gripping portion 28 side of the lever body 27 is flexed toward the front side of the vehicle body, so that the longitudinal intermediate portion (the flexed portion 27a) of the lever body 27 is formed in the form of letter "V" flexed along the direction of the pivotal direction. Incidentally, the forward/reverse switchover lever 16 can alternatively be formed in the shape of obtuse-angled hook, with locating the flexed portion 27a of the lever body 27 on the forward side of the vehicle body relative to the line segment interconnecting between the gripping portion 28 and the pivotal axis X1 such that the gripping portion 28 side of the lever body 27 is flexed toward the rear side of the vehicle body.

The lever body 27 is integrally fixed to one terminal end of the pivotal support portion 29 by means of welding. The engaging shaft portion 30 is integrally fixed by means of welding to the other terminal end of the pivotal support portion 29 to be parallel with the pivotal axis X1, that is, substantially parallel with the axis of the pivotal support shaft 21 and to project downward, so that the engaging shaft portion 30 comes into engagement with the guiding portion 23 on the side closer to the rotational support shaft 18 than to the pivotal support shaft 21.

Figure 7:
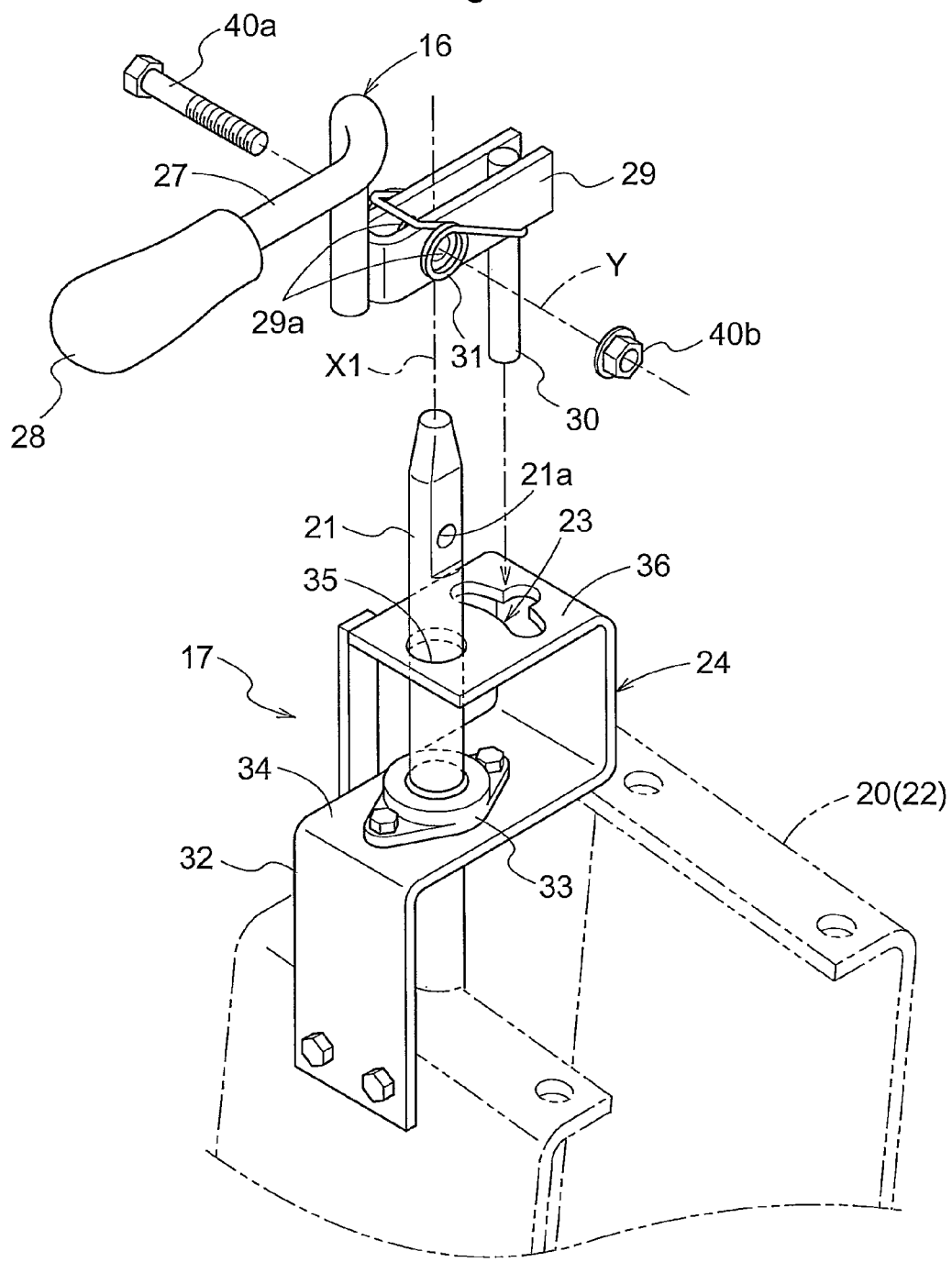

As shown in FIG. 6 and FIG. 7, an urging spring 31 is mounted between and across the forward/reverse switchover lever 16 and the pivotal support shaft 21 such that the gripping portion 28 side of the forward/reverse switchover lever 16 may be pivoted downward relative to the pivotal support shaft 21 and also the engaging shaft portion 30 may be pivoted in the direction away from the pivotal axis X1.

Figure 5:
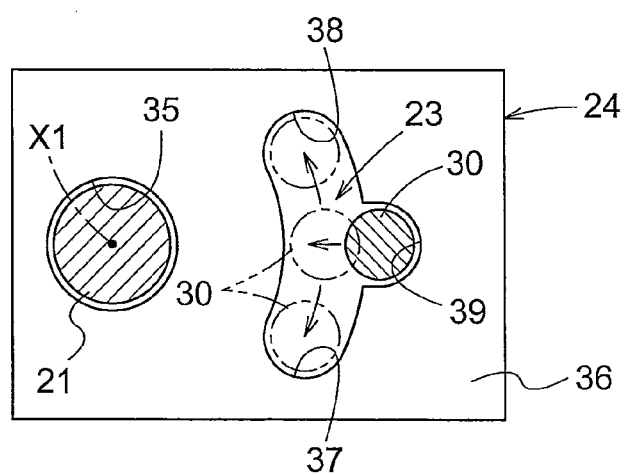

The guide plate 24 is formed by bending a single sheet of band-like flat plate. And, as shown in FIG. 5, FIG. 6 and FIG. 7, the guide plate 24 integrally includes a fixing plate portion 32 to be bolt-fixed to the support box 20 acting as the support member 22 of the pivotal support shaft 21, a bearing plate portion 34 to which there is to be bolt-fixed a bearing 33 for rotatably supporting the pivotal support shaft 21 and an engaging plate portion 36 that defines a support shaft inserting hole 35 into which the pivotal support shaft 21 is inserted for engagement between this pivotal support shaft 21 and the guide plate 24 and a guiding portion 23 engageable with the engaging shaft portion 30 of the forward/reverse switchover lever 16.

The guiding portion 23 is comprised of an arcuate elongate hole extending between a forward side hole end portion 37 with which the engaging shaft portion 30 comes into contact when the forward/reverse switchover lever 16 is moved to the forward traveling position and a reverse side hole end portion 38 with which the engaging shaft portion 30 comes into contact when the forward/reverse switchover lever 16 is moved to the reverse traveling position, so that the forward switchover lever 16 can be selectively guided to the forward traveling position or to the reverse traveling position or to a neutral position therebetween.

Therefore, when the forward/reverse switchover lever 16 is to be assembled to the pivotal support shaft 21, this assembling operation can be effected by inserting the engaging shaft portion 30 into the elongate hole, i.e. the guiding portion 23 from above. Hence, the assembling operation of the forward/reverse switchover lever 16 can be simple.

At the longitudinal center portion of the arcuate hole, there is formed an engaging recess 39 into which the engaging shaft portion 30 is introduced under the urging force of the urging spring 31 when the forward/reverse switchover lever 16 is moved to the neutral position. With this, inadvertent movement of the forward/reverse switchover lever 16 located at the neutral position to the forward traveling position or to the reverse traveling position is effectively prevented.

Therefore, when the forward/reverse switchover lever 16 set at the neutral position with the engaging shaft portion 30 being engaged in the engaging recess 39 is now to be moved to the forward traveling position or to the reverse traveling position, the gripping portion 28 side of the forward/reverse switchover lever 16 will be pivoted upward against the urging force, thus releasing the engagement between the engaging shaft portion 30 and the engaging recess 39. With this, the lever 16 can now be slidably moved to the forward traveling position or to the reverse traveling position.

Figure 4:
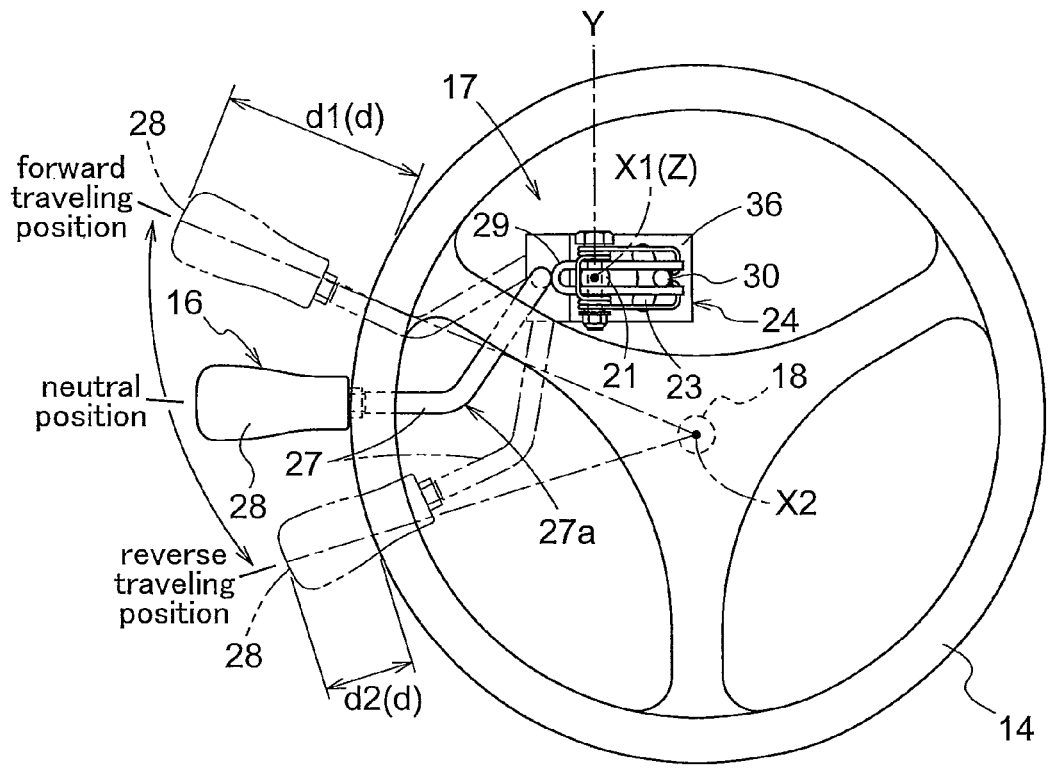

The forward/reverse switchover lever 16 is supported in such a manner that the gripping portion 28 projects laterally outward beyond the outer periphery of the steering wheel 14 as seen in the direction along the rotational axis X2 of the steering wheel 14 shown in FIG. 4.

The forward/reverse switchover lever 16, as shown in FIG. 3, is pivotable about a pivotal center Z at a position lower than the steering wheel 14. Specifically, the pivotal center Z of the forward/reverse switchover lever 16 is the point of intersection between the lateral axis Y which is the axis of the bolt 40a vertically pivotally supporting the pivotal support portion 29 relative to the pivotal support shaft 21 and the axis X1 of the pivotal support shaft 21.

When the pivotal center Z is projected along the rotational axis X2 onto the rotational plane of the steering wheel 14, the pivotal center Z is located inwardly of the outer periphery of the steering wheel 14 and at the same time at a position on the laterally outer side of the vehicle body of the rotational axis X2. That is, as shown in FIG. 4, the pivotal center Z is located at a position inside of the outer periphery of the steering wheel 14 and vehicle body laterally outer side of the rotational axis X2, as seen in the direction along the rotational axis X2 of the steering wheel 14.

Further, the pivotal center Z of the forward/reverse switchover lever 16 is set on the vehicle-body laterally outer side of the rotational axis X2 of the steering wheel 14 and on the forward side of the vehicle body, as seen in the direction along the rotational axis X2 of the steering wheel 14 shown in FIG. 4.

With the above-describing arrangement of the pivotal center Z, as seen in the direction along the rotational axis X2 of the steering wheel 14 shown in FIG. 4, the projection amounts (d) of the forward/reverse switchover lever 16 from the outer periphery of the steering wheel 14 in the radial direction of the steering wheel are set such that the projection amount (d2) when the forward/reverse switchover lever 16 is pivotally operated to the reverse traveling position is smaller than the projection amount (d1) when the forward/reverse switchover lever 16 is pivotally operated to the forward traveling position. The projection amount (d) when the forward/reverse switchover lever 16 is operated to the neutral position has an intermediate value between the projection amounts (d1) and (d2).

As shown in FIG. 3, the pivotal axis X1 of the forward/reverse switchover lever 16 (the axis of the pivotal support shaft 21) is inclined such that its upper side progressively approaches the forward side of the vehicle body and away from the rotational axis X2 of the steering wheel 14.

With the above-described inclination of the pivotal axis X1, a distance (c) between the forward/reverse switchover lever 16 and the steering wheel 14 in the direction along the rotational axis X2 of the steering wheel 14 is set such that the distance (c2) when the forward/reverse switchover lever 16 is pivotally operated to the reverse traveling position is smaller than the distance (c1) when the forward/reverse switchover lever 16 is pivotally operated to the forward traveling position. The distance (c) when the forward/reverse switchover lever 16 is operated to the neutral position has an intermediate value between the distances (c1) and (c2).

Therefore, as there is provided the forward/reverse switchover lever 16 which is more inclined to the front side of the vehicle body than the convention, when switched over to the forward traveling, there is created a sufficient vertical space between the steering wheel 14 and the forward/reverse switchover lever 16. Hence, the driver's first can be easily inserted. When switched over to the reverse traveling, the position of the gripping portion (lever grip) is not lowered so significantly, so the lever will not readily hit the knee or thigh of the driver, so that the driver can get on/off the vehicle easily and smoothly.

Other Embodiments (1) The work vehicle according to the present invention can be configured such that the pivotal center Z of the forward/reverse switchover lever 16 is disposed on the more left outer side of the vehicle body than the rotational axis X2 of the steering wheel 14 and on the front side of the vehicle body, or such that the pivotal center Z is disposed on the more right outer side of the vehicle body than the rotational axis X2 of the steering wheel 14 and on the front side of the vehicle body.

(2) The work vehicle according to the present invention can be configured as a work vehicle having a guide plate 24 forming a groove-like guiding portion 23 having a bottom.

INDUSTRIAL APPLICABILITY

The present invention can be applied to work vehicles other than a tractor, such as an agricultural work vehicle such as a combine or a construction work vehicle such as a backhoe.

DESCRIPTION OF REFERENCE NUMERALS/MARKS

13 driver's seat
14 steering wheel
16 forward/reverse switchover lever
21 pivotal support shaft
22 support member
23 guiding portion
24 guide plate
28 gripping portion (pivotal end)
30 engaging shaft portion
32 fixing portion
33 bearing
34 bearing plate portion
35 support shaft inserting hole
d projection amount
X1 pivotal axis
X2 rotational axis
Z pivotal center

The invention claimed is:

1. A work vehicle comprising:
a steering wheel disposed forwardly of a driver's seat and rotatably operable;
a forward/reverse switchover lever disposed forwardly of the driver's seat and pivotably operable between a forward traveling position capable of switching a traveling direction to the forward direction and a reverse traveling position on more rear side of the vehicle body than said forward traveling position and capable of switching the traveling direction to the reverse direction, across a neutral position therebetween; and
a pivotal support shaft pivotally supporting said forward/reverse switchover lever at a position lower than said steering wheel such that a pivotal end of said forward/reverse switchover lever projects laterally outward beyond an outer periphery of said steering wheel as seen along the direction of a rotational axis of said steering wheel;
wherein said pivotal center is set more forwardly of the vehicle body than said rotational axis as seen along the direction of the rotational axis such that, as seen along the direction of the rotational axis, the projection amount of the pivotal end from the outer periphery of the steering wheel when the forward/reverse switchover lever is pivotally operated to the reverse traveling position is smaller than the projection amount thereof when the forward/reverse switchover lever is pivotally operated to the forward traveling position;
wherein the pivotal center of the forward/reverse switchover lever is set at a position that is inwardly of the outer periphery of said steering wheel and that is laterally outer side of the vehicle body of the rotational axis of said steering wheel as seen along the direction of the rotational axis; and
wherein an entirety of a gripping portion of the forward/reverse switchover lever adjacent to the pivotal end of the forward/reverse switchover lever projects from the outer periphery of the steering wheel as seen along the direction of the rotational axis when the forward/reverse switchover lever is pivotally operated to the neutral position about the pivotal center of the forward/reverse switchover lever.

2. The work vehicle according to claim 1, wherein said pivotal support shaft is disposed such that a pivotal axis of this pivotal support shaft is inclined toward the forward side of the vehicle body relative to said rotational axis as seen laterally.

3. The work vehicle according to claim 1, wherein a longitudinal intermediate portion of the forward/reverse switchover lever is flexed in the direction along the pivotal direction as seen in the direction along the rotational axis.

4. The work vehicle according to claim 3, wherein the forward/reverse switchover lever is flexed from the side of the reverse traveling position toward the side of the forward traveling position.

5. The work vehicle according to claim 1,
wherein a pivotal axis of said forward/reverse switchover lever is set more forwardly of the vehicle body than the rotational axis of said steering wheel; and
wherein said forward/reverse switchover lever includes a first flexed portion flexed rearwardly as seen laterally of the vehicle body, and a second flexed portion flexed laterally and outwardly of the vehicle body at a position closer to the gripping portion than the first flexed portion as seen along the direction of the rotational axis of the steering wheel.

6. The work vehicle according to claim 1, wherein when the forward/reverse switchover lever is pivotally operated to the reverse traveling position about the pivotal center of the forward/reverse switchover lever, the gripping portion of the forward/reverse switchover lever adjacent the pivotal end of the forward/reverse switchover overlaps or is positioned underneath the outer periphery of the steering wheel as seen along the direction of the rotational axis of the steering wheel.

7. A work vehicle comprising:
a steering wheel disposed forwardly of a driver's seat and rotatably operable;
a forward/reverse switchover lever disposed forwardly of the driver's seat and pivotably operable between a forward traveling position capable of switching a traveling direction to the forward direction and a reverse traveling position on more rear side of the vehicle body than said forward traveling position and capable of switching the traveling direction to the reverse direction, across a neutral position therebetween, the forward/reverse switchover lever being pivotally operable about, as a pivotal center thereof, a position that is inwardly of an outer periphery of said steering wheel and that is laterally outer side of vehicle body of a rotational axis of said steering wheel as seen along the direction of this rotational axis; and
a pivotal support shaft pivotally supporting said forward/reverse switchover lever at a position lower than said steering wheel such that a pivotal end of said forward/reverse switchover lever projects laterally outward beyond the outer periphery of said steering wheel as seen along the direction of said rotational axis;
wherein said pivotal center is set more forwardly of the vehicle body than said rotational axis as seen along the direction of the rotational axis such that, as seen along the direction of the rotational axis, the projection amount of the pivotal end from the outer periphery of the steering wheel when the forward/reverse switchover lever is pivotally operated to the reverse traveling position is smaller than the projection amount thereof when the forward/reverse switchover lever is pivotally operated to the forward traveling position;
wherein the work vehicle further comprises:
a guide plate including a fixing portion to be fixed to a support member supporting said pivotal support shaft, a support shaft inserting hole engageable with said pivotal support shaft inserted therein, a plate face extending normal to said pivotal support shaft, and a guiding portion formed in said plate face for selectively guiding said forward/reverse switchover lever to the forward traveling position or the reverse traveling position or to said neutral position, said guiding portion being engageable with said forward/reverse switchover lever at positions corresponding to said forward traveling position, said reverse traveling position, and said neutral position;
wherein said forward/reverse switchover lever includes an engaging shaft portion provided substantially parallel with said pivotal support shaft and engageable with said guiding portion; and
wherein said guiding portion and said engaging shaft portion are disposed closer to a rotational support shaft rotatably supporting the steering wheel than the pivotal support shaft.

8. The work vehicle according to claim 7, wherein said guide plate integrally forms a bearing plate portion which includes a bearing for rotatably supporting said pivotal support shaft in cooperation with said support shaft inserting hole.

* * * * *